(12) United States Patent
Ganda et al.

(10) Patent No.: US 10,129,265 B2
(45) Date of Patent: Nov. 13, 2018

(54) FETCHING VENDOR SPECIFIC POLICY EVENTS AND CORRESPONDING DEVICE FEATURE MAPPINGS FROM A POLICY SERVER AT MOBILE DEVICE RUNTIME OF A MANAGED APPLICATION

(71) Applicant: CA, INC., New York, NY (US)

(72) Inventors: Madhusudhan Ganda, Kadapa (IN); Vikrant Nandakumar, Thanisandra (IN)

(73) Assignee: CA, INC., New York, NY (US)

( * ) Notice: Subject to any disclaimer, the term of this patent is extended or adjusted under 35 U.S.C. 154(b) by 366 days.

(21) Appl. No.: 14/869,575

(22) Filed: Sep. 29, 2015

(65) Prior Publication Data

US 2017/0093877 A1    Mar. 30, 2017

(51) Int. Cl.
*H04L 29/06* (2006.01)
*H04W 12/08* (2009.01)
*H04W 12/06* (2009.01)
*H04W 88/02* (2009.01)

(52) U.S. Cl.
CPC .......... *H04L 63/105* (2013.01); *H04W 12/08* (2013.01); *H04W 12/06* (2013.01); *H04W 88/02* (2013.01)

(58) Field of Classification Search
CPC ....... H04L 63/20; H04L 63/10; H04L 63/102; H04L 63/105; H04W 12/08; H04W 12/06; G06F 2221/2111; G06F 21/51; G06F 21/54; G06F 21/62; G06F 21/44; G06F 21/629; G06F 21/6209; G06F 8/60; G06F 8/76

See application file for complete search history.

(56) References Cited

U.S. PATENT DOCUMENTS

| | | | | |
|---|---|---|---|---|
| 2002/0178380 | A1* | 11/2002 | Wolf | H04L 41/0213 726/4 |
| 2010/0095348 | A1* | 4/2010 | Foster | G06F 21/6236 726/1 |
| 2013/0298185 | A1* | 11/2013 | Koneru | G06F 15/173 726/1 |
| 2016/0315967 | A1* | 10/2016 | Trevathan | H04L 63/20 |

* cited by examiner

*Primary Examiner* — Brian F Shaw
(74) *Attorney, Agent, or Firm* — Sage Patent Group (57) ABSTRACT

A policy file and a mapping file are fetched from a policy server responsive to a defined event associated with execution of an application by a mobile device. The policy file contains policy events that define features of the mobile device that the application is allowed to access. The mapping file defines associations between the features of the mobile device and the policy events. The policy file and the mapping file are locally saved in a local memory of the mobile device. A policy evaluation request is received that identifies a feature of the mobile device that the application will invoke. A policy event associated with the feature is identified based on content of the mapping file. The policy event associated with the feature is obtained from the policy file. Whether the application is allowed to invoke the feature is controlled based on evaluating whether the policy event is satisfied.

20 Claims, 7 Drawing Sheets

SDK Specific Integration

Evaluate Location Policy if (getPolicyEngineInstance().evaluateLocationPolicy()) {

/* Allowed to access location data */

}

Evaluate Contacts Policy if (getPolicyEngineInstance().evaluateContactsPolicy()) {

/* Allowed to access contacts data */

}

Evaluate Bluetooth Policy if (getPolicyEngineInstance().evaluateBluetoothPolicy()) {

/* Allowed to use bluetooth */

}

Evaluate Open-in Policy if (getPolicyEngineInstance().evaluateOpenInPolicy()) {

/* Allowed to call ACTION_SEND using intentes */

| Framework Class | Corresponding Vendor MAM SDK Class |
| --- | --- |
| Activity | VendorActivity |
| ActivityGroup | VendorActivityGroup |
| AliasActivity | VendorAliasActivity |
| ExpandableListActivity | VendorExpandableListActivity |
| LauncherActivity | VendorLauncherActivity |
| List:Actiivty | VendorListActivity |
| NativeActivity | VendorNativeActivity |
| TabActivity | VendorTabActivity |
| AccountAuthenticationActivity | VendorAccountAuthenticationActivity |
| PreferenceActivity | VendorPreferenceActivity |

Example Vendor Specific Policy Events Mapped to Mobile Device Specific Features

Device_feature_for_which_to_manage_access    #MAM_specific_policy_events_to_be_applied GPS      getPolicyEngineInstance().evaluateLocationPolicy()
Camera   getPolicyEngineInstance().evaluateCameraPolicy()

if more than one policy needs to be applied, specify them in sequence
Bluetooth     getPolicyEngineInstance().evaluateBluetoothPolicy(), getPolicyEngineInstance().evaluateOpenInPolicy()
AccessPhotos  getPolicyEngineInstance().evaluateImagePolicy(), getPolicyEngineInstance().evaluateOpenInPolicy()

if using print option: Google Cloud Print then use the method evaluatePrintPolicy(), otherwise use the method evaluateOpenInPolicy
Print  [Google Cloud Print: getPolicyEngineInstance().evaluatePrintPolicy() | getPolicyEngineInstance().evaluateOpenInPolicy()]

*Figure 5*

Dynamic Policy Check in App for MAM Compliant

```
If (evaluateAnyPolicy (deviceFeature) == ALLOW){       evaluateAnyPolicy (String deviceFeature) {

//application specific logic to invoke device feature    From property file, read the policy events to be applied for specific device feature } else { //if DENY, ...                                 If exception on opening or reading the file then return ALLOW// i.e. no specific policies defined eg. Unmanaged APP case //application specific logic to handle graciously   Else //it is managed app }                                                           Execute required policy events as per the dynamic hook configuration file Evaluate return values of each event Return ALLOW/ DENY/ ...
                                                       }
```

FETCHING VENDOR SPECIFIC POLICY EVENTS AND CORRESPONDING DEVICE FEATURE MAPPINGS FROM A POLICY SERVER AT MOBILE DEVICE RUNTIME OF A MANAGED APPLICATION

BACKGROUND

The present disclosure relates to controlling communications between applications and resources of a mobile device.

The principal of mobile application management (MAM) applies security policies to individual applications instead of to the operation of entire mobile devices. This means that different applications can have unique policies applied to them individually, and the applications can thereby be protected and manageable regardless of the management status of the mobile device hosting the application. Example application management features can include controlling an application's access to mobile device features using policies created by an information technology operator.

There are two primary approaches for making applications hook into a specific management platform: 1) software development toolkit (SDK) approach; and 2) application wrapping.

With the SDK approach, a MAM platform vendor provides a vendor specific code library to developers for their incorporation into applications at the time of development. The code library includes all of the features and hooks needed to integrate the application with the MAM platform, so that access by the application to features of the mobile device will be managed by the MAM platform.

The alternative approach is application wrapping. A complete application is surrounded (encapsulated) with application wrapper code to provide management hooks and perform security features. The application wrapper code is then compiled around executable code from the original application. The application wrapper code intercepts calls to operating system (OS) application programming interfaces (APIs) from the application executable code to control the application's use of mobile device features.

SUMMARY

Some embodiments of the present disclosure are directed to a method of performing operations on a processor of a mobile device. Responsive to occurrence of a defined event associated with execution of an application by the mobile device, a policy file and a mapping file are fetched from a policy server through a data network. The policy file contains policy events that define features of the mobile device that the application is allowed to access. The mapping file defines associations between the features of the mobile device and the policy events. The policy file and the mapping file are locally saved in a local memory of the mobile device. A policy evaluation request is received that identifies one of the features of the mobile device that the application will invoke. One of the policy events that is associated with the one of the features is identified based on content of the mapping file in the local memory. The one of the policy events, which is associated with the one of the features, is obtained from the policy file in the local memory. Whether the application is allowed to invoke the one of the features is controlled based on evaluating whether the one of the policy events obtained from the policy file in the local memory is satisfied.

Some other embodiments of the present disclosure are directed to a method of performing operations on a processor of a policy server. The operations include receiving a request message through a data network from a mobile device. The request message contains an identifier of an application on the mobile device and requests delivery of one of a plurality of policy files and one of a plurality of mapping files which are accessible through the policy server. The one of the plurality of policy files contains policy events that define features of the mobile device that the application is allowed to access. The one of the plurality of mapping file defines associations between the features of the mobile device and the policy events. The operations further include obtaining the one of the plurality of policy files and the one of the plurality of mapping files based on the identifier of the application, and communicating the one of the plurality of policy files and the one of the plurality of mapping files to the mobile device via the data network.

Some other embodiments of the present disclosure are directed to a mobile device that includes a processor in a memory coupled to the processor and storing computer readable program code that when executed by the processor causes the processor to perform operations. The operations include, responsive to occurrence of a defined event associated with execution of an application by the mobile device, fetching a policy file and a mapping file from a policy server through a data network. The policy file contains policy events that define features of the mobile device that the application is allowed to access. The mapping file defines associations between the features of the mobile device and the policy events. The operations further include locally saving the policy file and the mapping file in a local memory of the mobile device. The operations further include receiving a policy evaluation request that identifies one of the features of the mobile device that the application will invoke, identifying one of the policy events that is associated with the one of the features based on content of the mapping file in the local memory, and obtaining the one of the policy events, which is associated with the one of the features, from the policy file in the local memory. The operations further include controlling whether the application is allowed to invoke the one of the features based on evaluating whether the one of the policy events obtained from the policy file in the local memory is satisfied.

Other methods, mobile devices, and policy servers according to embodiments of the present disclosure will be or become apparent to one with skill in the art upon review of the following drawings and detailed description. It is intended that all such methods, mobile devices, and policy servers be included within this description, be within the scope of the present inventive subject matter, and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

The problem with the known SDK and application wrapping approaches for controlling an application is that substantial changes need to be made to the application to provide the desired management capabilities. To ensure that applications on application servers are ready to be managed in this manner, MAM platform vendors make their SDKs available to developers who are writing applications for the application servers. The application servers may, for example, include the Apple application store server (e.g., iTunes), one or more of the Android application store servers (e.g., Google Play and/or Amazon Appstore), and the Windows application store. The application programs can include gaming programs, spreadsheet programs, multimedia programs, word processing programs, database programs, presentation programs, etc.

A result of these approaches is that application compliance is limited only to those specific MAM platform vendors who have made their SDKs available to developers and which have been incorporated by the developers into the applications. Significant effort and costs are required to understand and properly integrate a vendor specific SDK into an application. Moreover, repetitive redeployment of applications is required to incorporate updated changes occurring in the vendor specific SDKs which are used by the applications.

Figure 1:
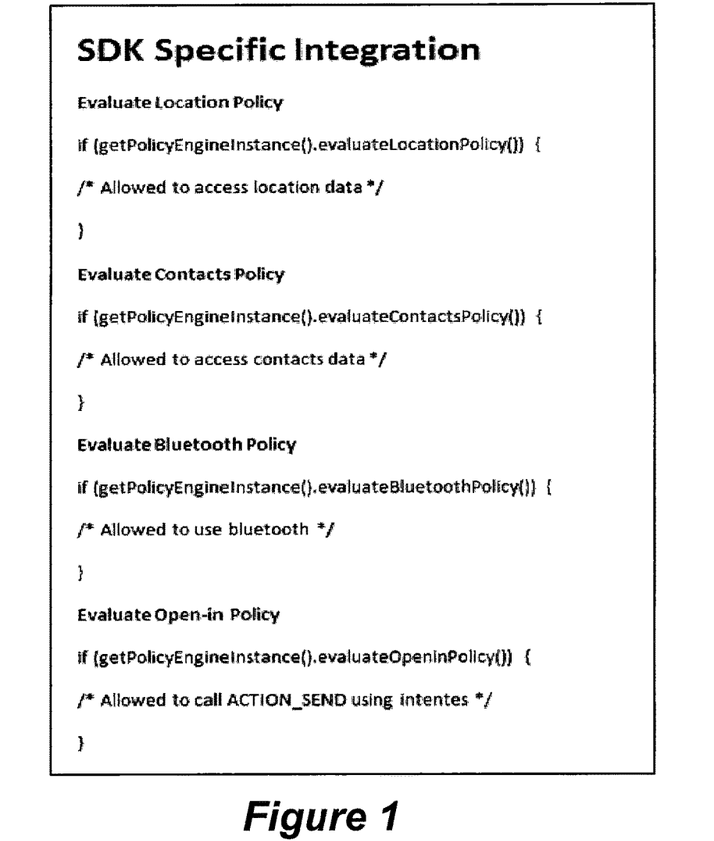
FIG. 1 illustrates vendor specific policy events, from a software development toolkit (SDK), that an application developer inserts into an application to generate a managed application.

FIG. 1 illustrates vendor specific policy events from a SDK that an application developer can insert into an application to generate an application that is managed at runtime on a mobile device. Referring to FIG. 1, a vendor specific policy event for evaluating whether an application is allowed access to a location feature of a mobile device is invoked by evaluating a function having syntax "getPolicyEngineInstance( ).evaluateLocationPolicy( )." Another vendor specific policy event for evaluating whether an application is allowed access to a contact information repository feature of a mobile device is invoked by evaluating a function having syntax "getPolicyEngineInstance( ).evaluateContactsPolicy( )." Another vendor specific policy event for evaluating whether an application is allowed access to a Bluetooth feature of a mobile device is invoked by evaluating a function having syntax "getPolicyEngineInstance( ).evaluateBluetoothPolicy( )." Accordingly, the SDK provides a library of policy events which define functions having a syntax that is likely unique to a particular MAM platform vendor.

When the application has classes that extend from the activity class or any of its derivative classes, then the classes with the corresponding vendor MAM SDK class need to be similarly extended. For example, an original application can contain the following code providing class extension:

```
import android.app.Activity;
...
public class MyActivity extends Activity {
```

The corresponding vendor MAM SDK class (vendor) is similarly extended as follows:

```
import com.vendor.android.app.vendorActivity;
...
public class MyActivity extends VendorActivity {
```

Figure 2:
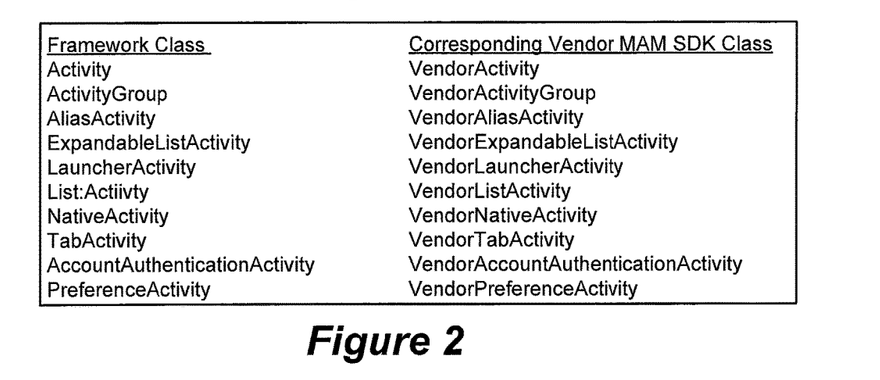
FIG. 2 illustrates explicit changes that an application developer needs to make to provide necessary inheritance of classes from original framework classes of the application to corresponding vendor specific mobile application management (MAM) SDK classes of the managed application.

FIG. 2 illustrates example changes that an application developer needs to make to provide necessary inheritance of classes from original framework classes of the application to corresponding vendor specific mobile application management (MAM) SDK classes for a managed application. Referring to FIG. 2, the example table provides a mapping of example android framework classes to the corresponding vendor MAM SDK classes. For example, the "Activity" class in the original application is replaced by "VendorActivity" in the managed application. Similarly, the "ActivityGroup" class in the original application is replaced by "VendorActivityGroup" in the managed application.

Various embodiments of the present disclosure arise from the present realization that there is a need for applications to be agnostic to vendor specific SDK integrations that can dynamically hook into any vendor specific SDK. Some embodiments insert a generic policy evaluation function (e.g. evaluateAnyPolicy) into an original application to generate a managed application. Execution of the generic policy evaluation function generates a policy evaluation request that identifies one of the features of the mobile device that the application will invoke. One of the policy events that is associated with the one of the features is identified based on content of a mapping file that has been fetched from a policy server to the local memory of the mobile device. The one of the policy events, which is associated with the one of the features, is obtained from a policy file which has also been fetched from the policy server to the local memory of the mobile device. Whether the application is allowed to invoke the one of the features is controlled based on evaluating whether the one of the policy events obtained from the policy file in the local memory is satisfied.

Accordingly, the application is managed using policies that have been fetched from a policy server at run time of the application. These operations can result in more rapid deployment of policy updates from the policy server to all applications which are to be managed by those policies, and avoids any need for a developer to recode the application in order to incorporate changes in the policies and/or the underlying SDK from a MAM platform vendor.

Although various embodiments are described herein in the context of providing MAM for an application, they are not limited thereto. These and other embodiments can be used with any types of policy functionality, such as for mobile application analytics (MAA).

Figure 3:
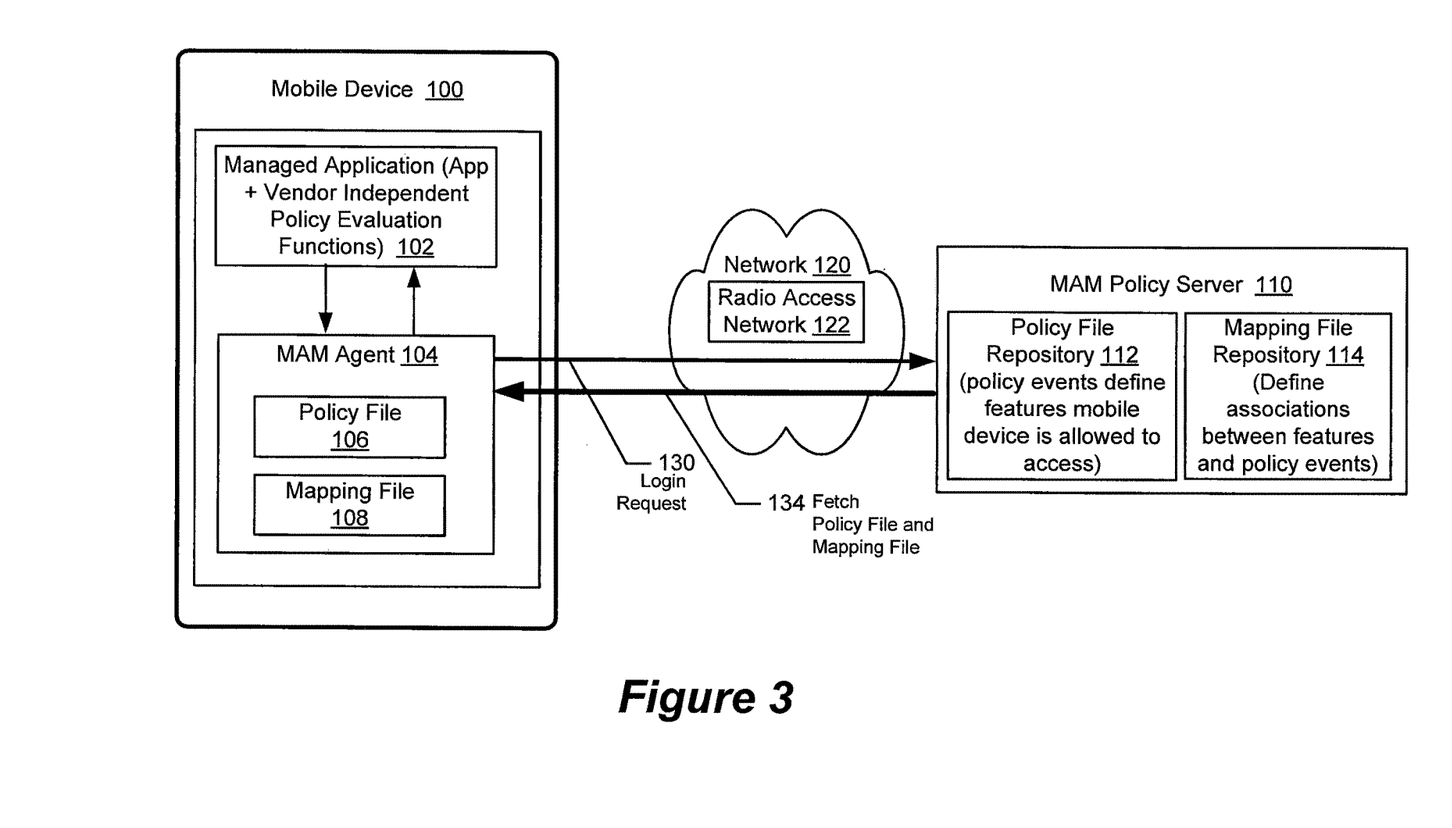
FIG. 3 is a block diagram of a mobile device and MAM policy server, and illustrates operations and data flows for the mobile device to fetch a vendor specific policy file and a mapping file according to some embodiments of the present disclosure.

FIG. 3 is an example block diagram of a mobile device 100 and MAM policy server 110, and illustrates operations and data flows for the mobile device 100 to fetch a vendor specific policy file and a mapping file from the policy server 110, and which are used to control access by the managed application 102 to features of the mobile device 100.

Figure 7:
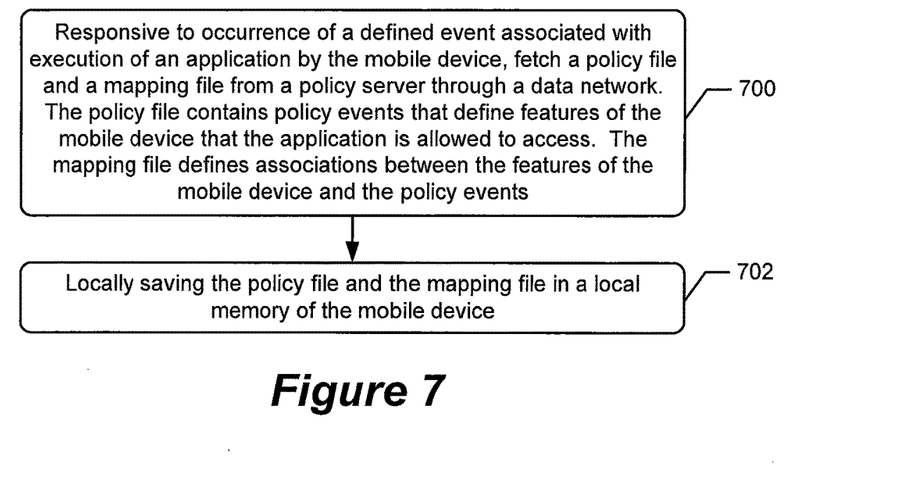
FIGS. 7 and 8 are flowcharts of operations by a mobile device to manage access by an application to features of the mobile device in accordance with some embodiments of the present disclosure.
Figure 8:
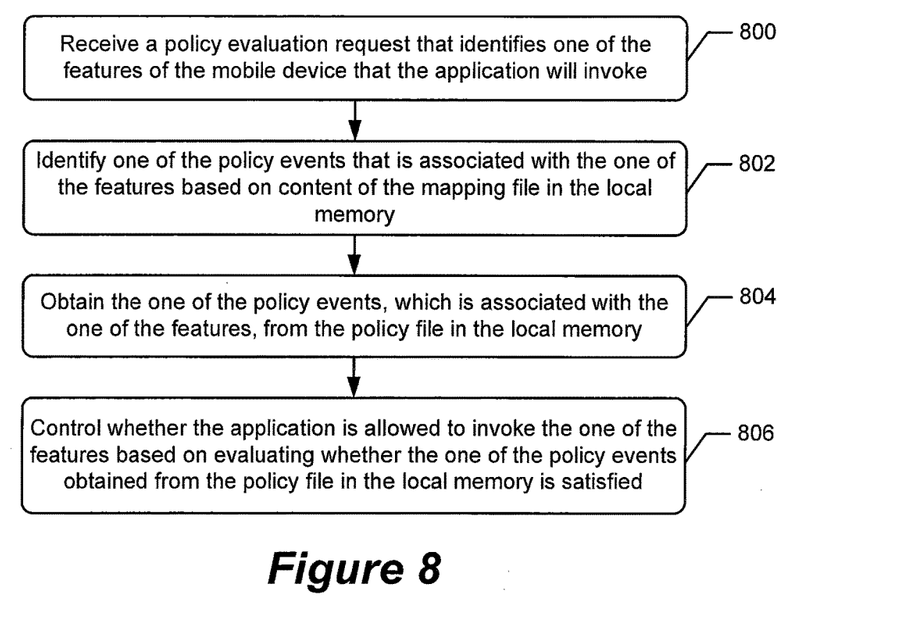
Figure 9:
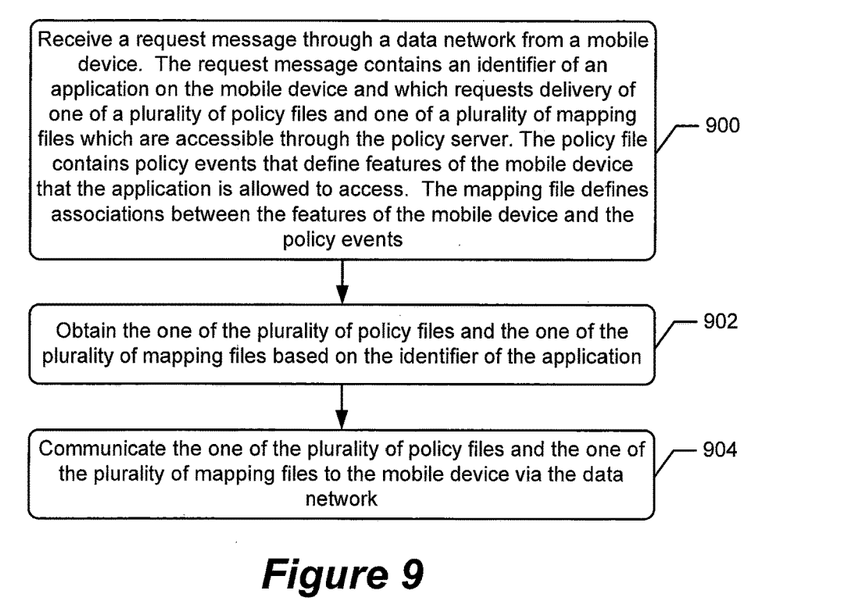
FIG. 9 is a flowchart of operations by a policy server to provide a policy file containing vendor specific policy events and a mapping file which defines associations between the features of the mobile device and the policy events, in accordance with some embodiments of the present disclosure.

FIGS. 7 and 8 are flowcharts of operations by the mobile device 100 to manage access by the managed application 102, also referred to as "application," to features of the mobile device 100 in accordance with some embodiments of the present disclosure. FIG. 9 is a flowchart of operations by the policy server 110 to provide a policy file containing vendor specific policy events and a mapping file which defines associations between the features of the mobile device 100 and the policy events, in accordance with some embodiments of the present disclosure.

Although various operations are disclosed which are attributed to being performed by one of the agent 104 and the application 102, one or more of such operations may be performed additionally or alternatively by the other one of the one of the agent 104 and the application 102. At least some of the functionality described with respect to the agent 104 may be performed by the application 102 and vice versa.

Referring to FIGS. 3 and 7-9, the application 102 contains the application executable code and vendor independent policy evaluation functions (e.g., "evaluateAnyPolicy(deviceFeatureIdentifier)." An agent 104, shown as a MAM agent without limitation, responds to occurrence of a defined event associated with execution of the application 102, such as a login event, by fetching (block 700) a policy file 106 and a mapping file 108 from a policy file repository 112 and a mapping file repository 114, respectively, on the policy server 110 through a data network 120. The policy file repository 112 contains a plurality of policy files, and the mapping file repository 114 contains a plurality of mapping files. The policy file and the mapping file may be selected among the files in the repositories 112 and 114 based on an identifier of the application that is provided by the mobile device 100 to the policy server 110. The data network 612 may include a radio access network 614 and a wireline network.

The fetched policy file 106 contains policy events that define features of the mobile device 100 that the application 102 is allowed to access. The fetched mapping file 108 defines associations between the features of the mobile device 100 and the policy events. The MAM agent 104 locally saves (block 702) the policy file 106 and the mapping file 108 in a local memory of the mobile device 100.

FIG. 9 shows corresponding operations by the policy server 110 to provide the policy file and the mapping file to the MAM agent 104. The policy server 110 receives (block 900) a request message through the data network 120 from the mobile device 100. The request message contains an identifier of the application 102 and requests delivery of one of a plurality of policy files contained in the policy file repository 112 and one of a plurality of mapping files contained in the mapping file repository 114, which are accessible through the policy server 110. The policy file can be selected from among the policy files in the repository 112 based on the identifier provided in the request message. Similarly, the mapping file can be selected from among the mapping files in the repository 114 based on the identifier provided in the request message. The policy server 110 obtains (block 902) the policy file and the mapping file from the respective repositories 112 and 114 based on the identifier of the application, and communicates (block 904) the policy file and the mapping file to the mobile device 100 via the data network 120.

In some embodiments, the MAM agent 104 fetches the policy file and the mapping file from the policy server 110 responsive to startup of the application 102 or another defined event. In one embodiment, the MAM agent 104 identifies occurrence of the defined event associated with execution of the application 102 responsive to receiving login information from the application 102 identifying a user of the mobile device. The MAM agent 104 responsively fetches the policy file and the mapping file from the policy server 110 based on communicating a login request message 130 (FIG. 3) through the data network 120 to the policy server 110. The login request message contains the login information. The MAM agent 104 then fetches the policy file and the mapping file from the policy server 110 responsive to receiving an indication from the policy server 110 that the user is authorized to request the policy file and the mapping file from the policy server 110.

Corresponding operations by the policy server 110 can include receiving the login request message 130 through the data network 120 from the application 102, where the login request message contains login information identifying a user of the mobile device. The policy server 110 can determine whether the user is authorized to request delivery of a policy file and a mapping file from the policy server 110, and can restrict its communication of the policy file and the mapping file to the mobile device 100, to only occur responsive to the user being determined to be authorized to request delivery of a policy file and a mapping file from the policy server 110.

In another embodiment, the defined event that triggers the MAM agent 104 to fetch the policy file and the mapping file from the policy server 110 is responsive to expiration of a defined time duration since the policy file and the mapping file were last fetched from the policy server 110. The MAM agent 104 can respond to expiration of the defined time duration by further fetching a policy file and a mapping file from the policy server 110, update the policy file 106 in the local memory of the mobile device 100 based on the policy file further fetched from the policy server 110, and update the mapping file 108 in the local memory of the mobile device 100 based on the mapping file further fetched from the policy server 110. Accordingly, the mapping file and the policy file can be periodically updated during continuing operation of the application 102.

In a further embodiment, the MAM agent 104 updates the policy file 106 and the mapping file 108 in the local memory by synchronizing content of the policy file 106 in the local memory to correspond to content of the policy file further fetched from the policy server 110, and synchronizing content of the mapping file 108 in the local memory to correspond to content of the mapping file further fetched from the policy server 110.

In another embodiment the defined event that triggers the MAM agent 104 to fetch the policy file and the mapping file from the policy server 110 is a number of times that one of the features of the mobile device 100 is invoked by the application 102. The MAM agent 104 can count a number of times that one of the features of the mobile device 100 is invoked by the application 102, and identify occurrence of another defined event associated with execution of the application 102 by the mobile device 100 responsive to the number of times satisfying a defined threshold value. The MAM agent 104 can then further fetch a policy file and a mapping file from the policy server 110 responsive to identifying the occurrence of the another defined event, update the policy file 106 in the local memory of the mobile device 100 based on the policy file further fetched from the policy server 110, and update the mapping file 108 in the local memory of the mobile device 100 based on the mapping file further fetched from the policy server 110. Accordingly, the mapping file and the policy file can be updated to reflect changed mappings and/or policies when the application has been selected for execution by a user a defined number of times. This approach can allow different policies to be fetched from the policy server 110 to provide more limited or different feature access capability to the application 102 based on, for example, how many times the application has been used by a user. A user may be rewarded with an expanded set of features that are made available to the application 102 by the updated policies based on the user using the application more than a threshold number of times. Conversely, a user may be penalized with a reduced set of features that are made available to the application 102 by the updated policies based on the user using the application more than a threshold number of times.

Accordingly, the MAM agent 104 operates to load and/or update the policy file 106 in the mapping file 108 in the local memory of the mobile device 100 responsive to defined events during run-time of the application 102. The newest version of policies and mappings are retrieved from the policy server 110 and used to control access by the application 102 to features of the mobile device 100.

FIG. 8 illustrates further operations that can be performed by the mobile device 100, such as by the MAM agent 104, to control access by the application 102 to the mobile device features. Referring to FIG. 8, the MAM agent 104 receives (block 800) a policy evaluation request that identifies one of the features of the mobile device 100 that the application 102 will invoke. In one embodiment, the MAM agent 104 receives (block 800) an argument from a policy evaluation function that is contained in the application 102 and executed by the mobile device 100, where the argument identifies the one of the features of the mobile device. The policy evaluation function is configured to be executed before the OS API call can be executed by the mobile device 100.

The MAM agent 104 identifies (block 802) one of the policy events that is associated with the one of the features based on content of the mapping file 108 in the local memory. The MAM agent 104 obtains (block 804) the one of the policy events, which is associated with the one of the features, from the policy file 106 in the local memory. The MAM agent 104 then controls (block 806) whether the application 102 is allowed to invoke the one of the features based on evaluating whether the one of the policy events obtained from the policy file 106 in the local memory is satisfied.

The MAM agent 104 may provide the control (block 806) by, responsive to determining that the application 102 is allowed to invoke the one of the features, signaling the application 102 to execute an operating system (OS) application programming interface (API) call that invokes the one of the features. In contrast, responsive to determining that the application is not allowed to invoke the one of the features, the MAM agent 104 can signal the application 102 to prevent execution of the OS API call that invokes the one of the features.

The MAM agent 104 can repeat the operations of FIG. 8 responsive to each policy evaluation request that is received from the application 102. For example, the MAM agent 104 can receive (block 800) another policy evaluation request that identifies another one of the features of the mobile device 100 that the application 102 will invoke, identify (block 802) another one of the policy events that is associated with the another one of the features based on content of the mapping file 108 in the local memory, obtain (block 804) the another one of the policy events associated with the another one of the features from the policy file on 06 in the local memory, and control (block 806) whether the application 102 is allowed to invoke the another one of the features based on evaluating whether the another one of the policy events obtained from the policy file 106 in the local memory is satisfied.

As will be explained in further detail below, the policy evaluation request and the subsequently received another policy evaluation request can be generated by different ones of a pair of policy evaluation functions contained at different locations within the application 102. The pair of policy evaluation functions can have a same syntax as each other, but with an argument of one of the pair of policy evaluation functions identifying the one of the features (e.g., location service) of the mobile device 100, and an argument of the other one of the pair of policy evaluation functions identifying the another one of the features (e.g., cellular communication interface) of the mobile device 100.

For example, the argument of the one of the pair of policy evaluation functions and the argument of the other one of the pair of policy evaluation functions can identify two different ones of the following features of the mobile device 100: a camera, a microphone, a location service, a contact information repository, cut and paste operations within a document or user interface window, an external storage device interface (e.g., USB, Lightning, etc.), a cellular communication interface, a WiFi communication interface, a Bluetooth communication interface, Internet services, and encryption.

Figure 4:
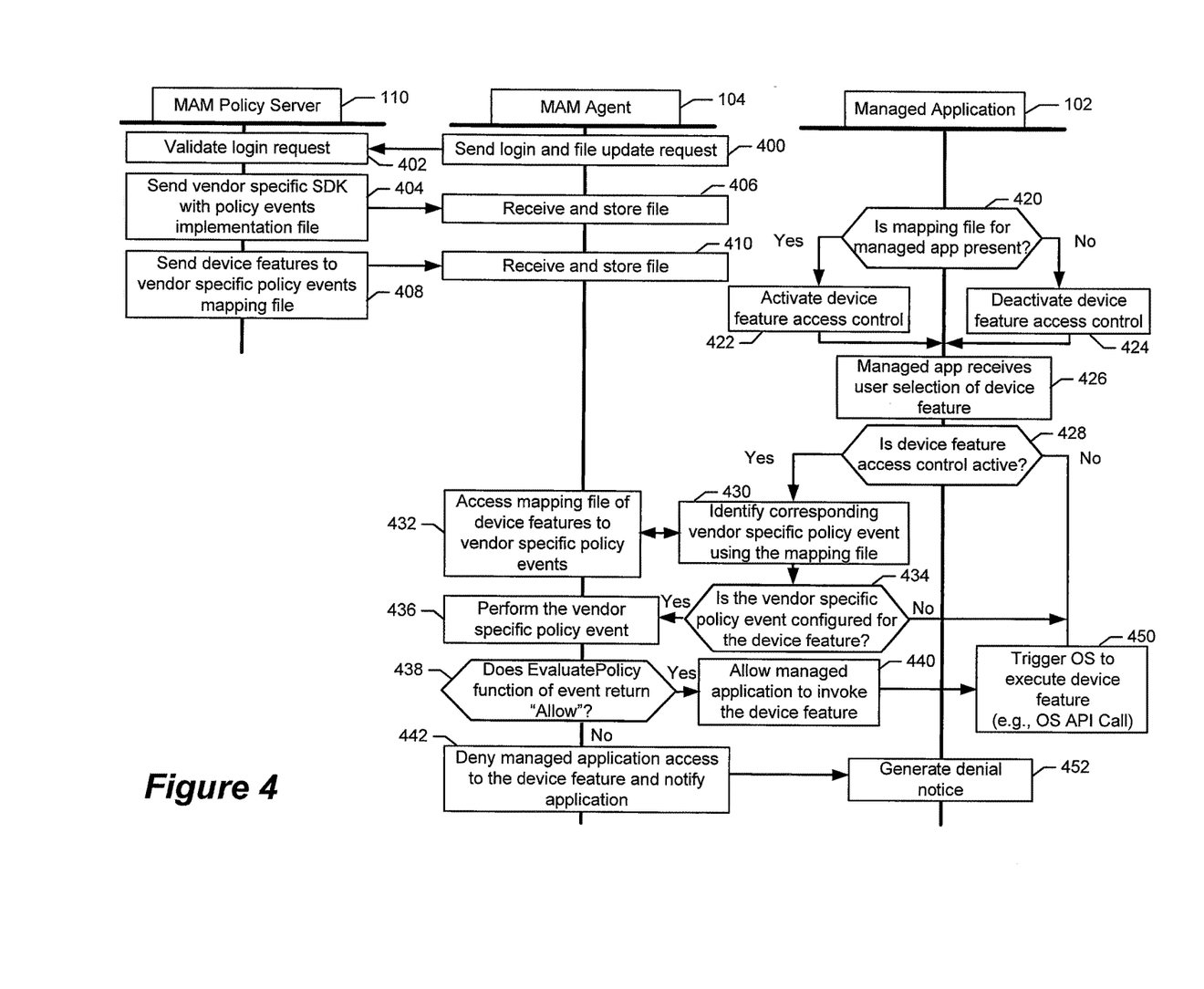
FIG. 4 illustrates operations and data flows by the MAM policy server, the MAM agent, and the managed application to control access by the managed application to features of the mobile device using the vendor specific policy file and the mapping file from the MAM policy server, in accordance with some embodiments of the present disclosure.

These and other further operations will now be described in the context of FIG. 4, which illustrates operations and data flows by the policy server 110, the MAM agent 104, and the application 102 to control access by the application 102 to features of the mobile device 100 using the vendor specific policy file 106 and the mapping file 108 from the policy server 110, in accordance with some embodiments of the present disclosure.

The MAM agent 104 sends (block 400) a login file update request to the policy server 110. The policy server 110 validates (block 402) the login request and, responsive to completing proper validation, sends (block 404) the vendor specific SDK with policy events implementation file to the MAM agent 104, and sends (block 408) the device features to vendor specific policy events mapping file to the MAM agent 104. The MAM agent 104 receives and stores (block 406) the policy file, and receives and stores (block 410) the mapping file 108.

The managed application 102 responds to a defined event by determining (block 420) whether the mobile device 100 contains a mapping file in local memory relating to the application 102. The defined event may correspond to operations performed to install the application 102 on the mobile device 100, operational relating to initiating execution of the application 102, and/or another defined event related to operation of the application 102.

Based on determining (block 420) that a mapping file is not contained in the local memory, the application 102 deactivates (block 424) MAM control of its access to features of the mobile device 100 ("deactivate device feature access control"). In contrast, based on determining (block 420) that a mapping file is contained in the local memory, the application 102 activates (block 422) MAM control of its access to features of the mobile device 100 ("activate device feature access control").

The application 102 receives (block 426) a user selection of a device feature or other event triggering the application 102 to request invocation (access) of the device feature. As explained with regard to FIG. 8, the application 102 may generate a policy evaluation request that identifies one of the features of the mobile device that the application 102 will invoke. The application 102 determines (block 428) whether the "device feature access control" is active and, if not, triggers (block 450) the operating system (OS) to execute the device feature, such as by performing an OS application programming interface (API) call directed to the device feature.

In contrast, based on the application 102 determining (block 428) that the "device feature access control" is active, the mapping file 108 is accessed (block 432) by the MAM agent 104 and/or the application 102) to identify (block 430) a vendor specific policy event the corresponds to the feature that the application 102 wants to invoke.

The application 102 and/or the MAM agent 104 determines (block 434) whether the vendor specific policy event that has been identified is configured for the device feature. If not, the MAM agent 104 triggers (block 450) the operating system (OS) to execute the device feature, e.g., by performing an OS application programming interface (API) call directed to the device feature.

In contrast, when the vendor specific policy event is determined (block 434) to be configured for device feature, the MAM agent 104 performs the vendor specific policy event to evaluate (block 438) whether the application 102 is allowed access to the identified device feature. In the non-limiting example of FIG. 4, the MAM agent 104 determines whether the "EvaluatePolicy" function of the event returns "allow." When the evaluated vendor specific policy event allows access, the MAM agent 104 signals (block 440) the manager application 102 to invoke the device feature, which triggers (block 450) the operating system (OS) to execute the device feature.

In contrast, when the evaluated vendor specific policy event returns "deny," the MAM agent 104 controls the application 102 to deny access by the application 102 to the device feature. The MAM agent 104 may notify the application 102 of the feature access denial decision, which may trigger the application 102 to generate (block 452) a denial notification, such as by displaying a denial message on a display device of the mobile device 100.

Figure 5:
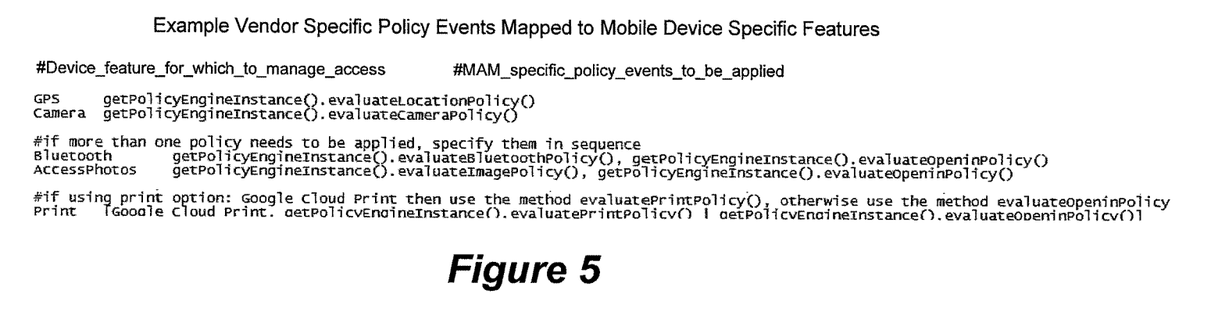
FIG. 5 illustrates an example mapping file containing information mapping vendor specific policy events to mobile device specific features of the mobile device according to some embodiments of the present disclosure.

FIG. 5 illustrates example content of a mapping file 108 that maps vendor specific policy events to mobile device specific features of the mobile device, according to some embodiments of the present disclosure. Referring to FIG. 5, a GPS feature is mapped to a vendor specific policy event "getPolicyEngineInstance( ).evaluateLocationPolicy( )." A camera feature is mapped to a vendor specific policy "getPolicyEngineInstance( ).evaluateCameraPolicy( )."

When more than one policy event is to be applied to control access by the application 102 to one or more features of the mobile device, the policy events can be listed sequentially in the mapping file 108. For example, the Bluetooth feature is mapped to two vendor specific policy events "getPolicyEngineInstance( ).evaluateBluetoothPolicy( ), getPolicyEngineInstance( ).evaluateOpeninPolicy( )." Similarly, the AccessPhotos feature is mapped to two vendor specific policy events "getPolicyEngineInstance( ).evaluateImagePolicy( ), getPolicyEngineInstance( ).evaluateOpeninPolicy( )."

Conditional mappings may also be defined in the mapping file 108. For example, when using a print option of Google Cloud print, the vendor specific policy event which is used can be "evaluatePrintPolicy( )," and can otherwise use the vendor specific policy event "evaluateOpeninPolicy( )", shown by the example syntax and the last line of FIG. 5.

Figure 6:
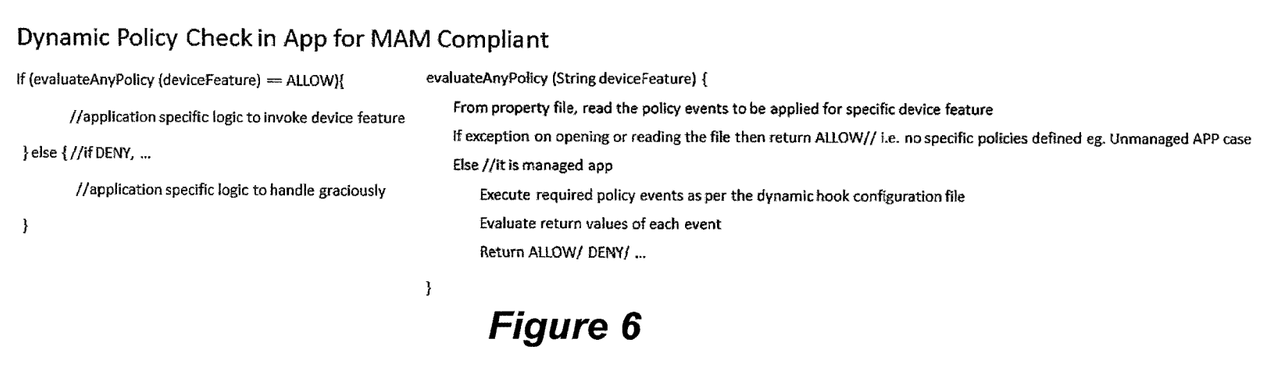
FIG. 6 illustrates operations that are performed responsive to a policy evaluation function being executed in a managed application, to evaluate a vendor specific policy event that is identified based on an identified feature of the mobile device, in accordance with some embodiments of the present disclosure.

FIG. 6 illustrates operations that are performed responsive to a policy evaluation function being executed in the managed application 102, to evaluate a vendor specific policy event that is identified based on an identified feature of the mobile device 100, in accordance with some embodiments of the present disclosure. Referring to FIG. 6, the MAM agent 104 and/or the application 102 performs a dynamic policy check. A policy evaluation function "evaluateAnyPolicy" with an argument "deviceFeature," identifying the feature of the mobile device 100 that the application 102 wants to invoke, is executed. The "deviceFeature" is used as a pointer to look up in the mapping file 108 a policy corresponds to the identified feature. The policy is evaluated to determine whether the access is allowed or denied. Responsive to the policy returning "allow," the application 102 is allowed to invoke the device feature. In contrast, responsive to the policy returning "deny," application 102 does not invoke the device feature and may contain alternative operations that are performed based on the denial to avoid incurring an operational error ("graciously").

Figure 10:
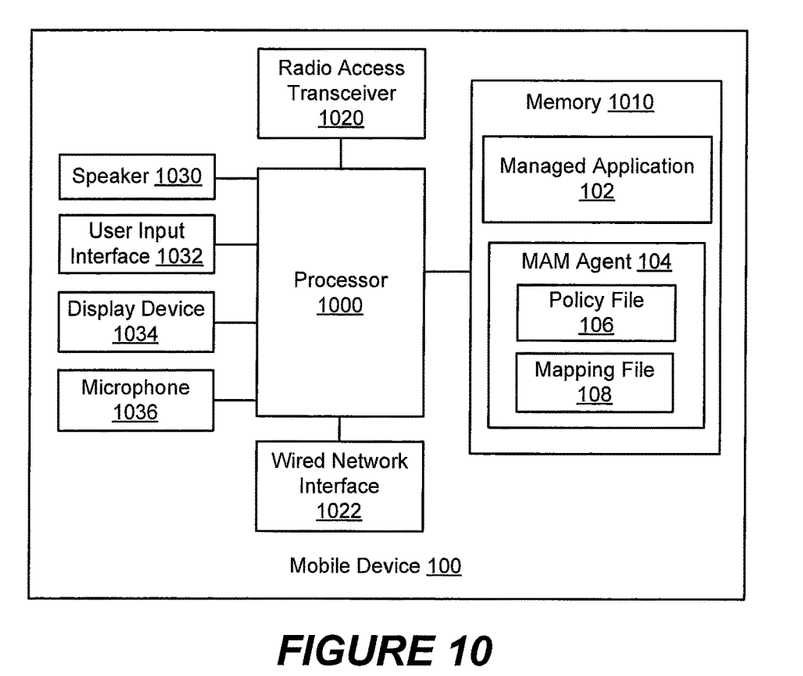
FIG. 10 is a block diagram of a mobile device configured according to some embodiments.

FIG. 10 is a block diagram of a mobile device 100 configured according to some embodiments of the present disclosure. Referring to FIG. 10, the mobile device 100 includes a processor 1000, a memory 1010, and a network interface which may include a radio access transceiver 1020 and/or a wired network interface 1022 (e.g., Ethernet interface). The radio access transceiver 1020 can include, but is not limited to, a LTE or other cellular transceiver, WLAN transceiver (IEEE 802.11), WiMax transceiver, or other radio communication transceiver configured to communicate with the MAM policy server 110 via a radio access network.

The processor 1000 may include one or more data processing circuits, such as a general purpose and/or special purpose processor, such as a microprocessor and/or digital signal processor. The processor 1000 is configured to execute computer program code in the memory 1010, described below as a non-transitory computer readable medium, to perform at least some of the operations described herein as being performed by a user terminal. The computer program code may include the managed application 102 and the MAM agent 104, which may include the policy file 106 and the mapping file 108. The mobile device 100 may further include a speaker 1030, user input interface 1032 (e.g., touch screen, keyboard, keypad, etc.), a display device 1034, and a microphone 1036.

Figure 11:
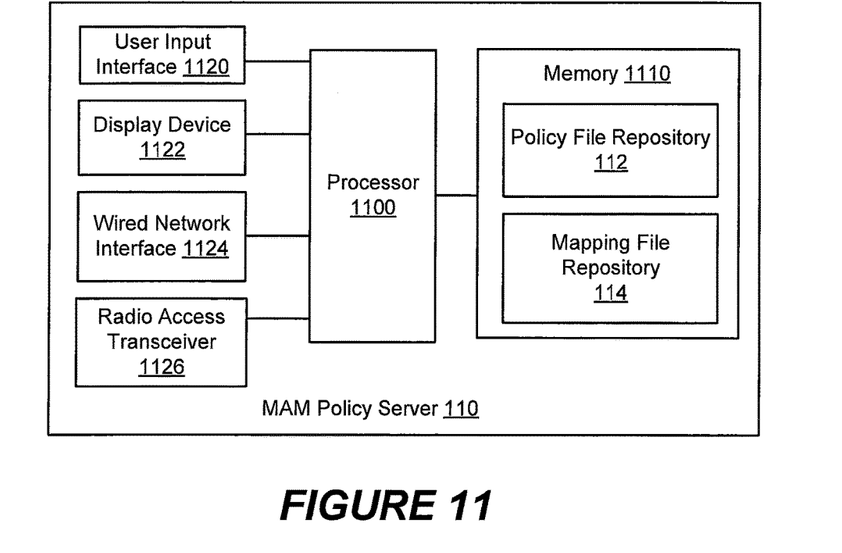
FIG. 11 is a block diagram of a MAM policy server configured according to some embodiments.

FIG. 11 is a block diagram of a MAM policy server 110 configured according to some embodiments of the present disclosure. The MAM policy server 110 includes a processor 1100, a memory 1110, and a network interface which may include a radio access transceiver 1126 and/or a wired network interface 1124 (e.g., Ethernet interface). The radio access transceiver 1126 can include, but is not limited to, a LTE or other cellular transceiver, WLAN transceiver (IEEE 802.11), WiMax transceiver, or other radio communication transceiver configured to communicate with the mobile device 100 via a radio access network.

The processor 1100 may include one or more data processing circuits, such as a general purpose and/or special purpose processor (e.g., microprocessor and/or digital signal processor) that may be collocated or distributed across one or more networks. The processor 1100 is configured to execute computer program code in the memory 1110, described below as a non-transitory computer readable medium, to perform at least some of the operations described herein as being performed by an application analysis computer. The computer program code may include a policy file repository 112 and a mapping file repository 114 that operate based on one or more of the embodiments disclosed herein. The MAM policy server 110 may further include a user input interface 1120 (e.g., touch screen, keyboard, keypad, etc.) and a display device 1122.

FURTHER DEFINITIONS AND EMBODIMENTS

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
  performing operations as follows on a processor of a mobile device:
    responsive to occurrence of a defined event associated with execution of an application by the mobile device, fetching a policy file and a mapping file from a policy server through a data network, the policy file containing vendor specific policy events that define vendor specific device features that the application is allowed to access, the mapping file defining associations between mobile device specific features of the mobile device and device features, wherein the mapping file is different from the policy file, and wherein each vendor specific device feature defined by the vendor specific policy events in the policy file corresponds to a device feature associated with a mobile device specific feature of the mobile device in the mapping file;
    locally saving the policy file and the mapping file in a local memory of the mobile device;
    receiving a policy evaluation request that identifies one of the mobile device specific features of the mobile device that the application will invoke;
    identifying one of the vendor specific policy events that defines one of the vendor specific device features corresponding to one of the device features that is associated with the one of the mobile device specific features in the mapping file, based on content of the mapping file in the local memory defining the association between the one of the device features and the one of the mobile device specific features;
    obtaining the one of the vendor specific policy events defining the one of the vendor specific device features, which corresponds to the one of the device features associated with the one of the mobile device specific features, from the policy file in the local memory;
    evaluating whether the application is allowed to access the one of the vendor specific device features, which corresponds to the one of the device features associated with the one of the mobile device specific features; and
    based on the evaluating, controlling whether the application is allowed to invoke the one of the mobile device specific features.

2. The method of claim 1, wherein the operations further comprise:
  receiving another policy evaluation request that identifies another one of the mobile device specific features of the mobile device that the application will invoke;
  identifying another one of the policy events that defines another one of the vendor specific device features corresponding to another one of the device features that is associated with the another one of the mobile device specific features based on content of the mapping file in the local memory defining the association between the another one of the device features and the another one of the mobile device specific features;
  obtaining the another one of the policy events defining the another one of the vendor specific device features, which corresponds to the another one of the device features associated with the another one of the mobile device specific features, from the policy file in the local memory;

evaluating whether the application is allowed to access the another one of the vendor specific device features, which corresponds to the another one of the device features associated with the another one of the mobile device specific features; and based on the evaluating, controlling whether the application is allowed to invoke the another one of the mobile device specific features.

3. The method of claim 2, wherein:

the policy evaluation request and the another policy evaluation request are generated by different ones of a pair of policy evaluation functions contained at different locations within the application, the pair of policy evaluation functions having a same syntax as each other, an argument of one of the pair of policy evaluation functions identifies the one of the mobile device specific features of the mobile device, and an argument of the other one of the pair of policy evaluation functions identifies the another one of the mobile device specific features of the mobile device.

4. The method of claim 3, wherein the argument of the one of the pair of policy evaluation functions and the argument of the other one of the pair of policy evaluation functions identify two different ones of the following mobile device specific features of the mobile device: a camera feature; a microphone feature; a location services feature; and a contact information repository feature.

5. The method of claim 1, wherein the vendor specific policy events contained in the policy file fetched from the policy server comprise mobile application management (MAM) policy events defined by a MAM product vendor.

6. The method of claim 5, wherein the fetching the policy file and the mapping file, the locally saving the policy file and the mapping file, the receiving the policy evaluation request, the identifying the one of the vendor specific policy events, the obtaining the one of the vendor specific policy events, the evaluating whether the application is allowed to access the one of the vendor specific device features, and the controlling whether the application is allowed to invoke the one of the mobile device specific features, are each performed by a MAM agent executed by the mobile device, and the MAM agent requires content of both of the policy file and the mapping file in the local memory to control whether the application is allowed to access the mobile device specific features of the mobile device using content of the policy file and the mapping file in the local memory.

7. The method of claim 1, wherein the operations further comprise:

identifying the occurrence of the defined event associated with execution of the application by the mobile device responsive to receiving login information from the application identifying a user of the mobile device, wherein the fetching the policy file and the mapping file from the policy server through the data network, comprises:

communicating a login request message through the data network to the policy server, the login request message containing the login information;

fetching the policy file and the mapping file from the policy server responsive to receiving an indication from the policy server that the user is authorized to request the policy file and the mapping file from the policy server.

8. The method of claim 1, wherein the operations further comprise:

identifying occurrence of another defined event associated with execution of the application by the mobile device, responsive to expiration of a defined time duration since the policy file and the mapping file were last fetched from the policy server;

further fetching a policy file and a mapping file from the policy server responsive to identifying the occurrence of the another defined event;

updating the policy file in the local memory of the mobile device based on the policy file further fetched from the policy server; and updating the mapping file in the local memory of the mobile device based on the mapping file further fetched from the policy server.

9. The method of claim 8, wherein the updating the policy file and the updating the mapping file in the local memory of the mobile device, comprises:

synchronizing content of the policy file in the local memory to correspond to content of the policy file further fetched from the policy server; and synchronizing content of the mapping file in the local memory to correspond to content of the mapping file further fetched from the policy server.

10. The method of claim 1, wherein the operations further comprise:

counting a number of times that one of the mobile device specific features of the mobile device is invoked by the application;

identifying occurrence of another defined event associated with execution of the application by the mobile device, responsive to the number of times satisfying a defined threshold value, wherein the defined threshold value is two or more;

further fetching a policy file and a mapping file from the policy server responsive to identifying the occurrence of the another defined event;

updating the policy file in the local memory of the mobile device based on the policy file further fetched from the policy server; and updating the mapping file in the local memory of the mobile device based on the mapping file further fetched from the policy server.

11. The method of claim 1, wherein the controlling whether the application is allowed to invoke the one of the mobile device specific features comprises:

responsive to determining, based on the evaluating, that the application is allowed to invoke the one of the mobile device specific features, signaling the application to execute an operating system (OS) application programming interface (API) call that invokes the one of the mobile device specific features; and responsive to determining, based on the evaluating, that the application is not allowed to invoke the one of the mobile device specific features, signaling the application to prevent execution of the OS API call that invokes the one of the mobile device specific features.

12. The method of claim 11, wherein the receiving a policy evaluation request that identifies one of the mobile device specific features of the mobile device that the application will invoke, comprises:

receiving an argument from a policy evaluation function that is contained in the application and executed by the mobile device, the argument identifying the one of the mobile device specific features of the mobile device, and the policy evaluation function is configured to be executed before the OS API call can be executed by the mobile device.

13. A method comprising:
performing operations as follows on a processor of a policy server:
receiving a request message through a data network from a mobile device, the request message containing an identifier of an application on the mobile device and which requests delivery of one of a plurality of policy files and one of a plurality of mapping files which are accessible through the policy server, the one of the plurality of policy files containing vendor specific policy events that define vendor specific device features that the application is allowed to access, the one of the plurality of mapping file defining associations between the features of the mobile device and device features, wherein the mapping file is different from the policy file, and wherein each vendor specific device feature defined by the vendor specific policy events in the policy file corresponds to a device feature associated with a mobile device specific feature of the mobile device in the mapping file;
obtaining the one of the plurality of policy files and the one of the plurality of mapping files based on the identifier of the application; and
communicating the one of the plurality of policy files and the one of the plurality of mapping files to the mobile device via the data network.

14. The method of claim 13, wherein the operations further comprise:
prior to receiving the request message, receiving a login request message through the data network from the application being executed by the mobile device, the login request message containing login information identifying a user of the mobile device;
determining whether the user is authorized to request delivery of a policy file and a mapping file from the policy server,
wherein the communicating the one of the plurality of policy files and the one of the plurality of mapping files to the mobile device via the data network is only performed based on the user being determined to be authorized to request delivery of a policy file and a mapping file from the policy server.

15. The method of claim 13, wherein the communicating the communicating the one of the plurality of policy files and the one of the plurality of mapping files to the mobile device via the data network, comprises:
synchronizing content of a policy file residing in a local memory of the mobile device to correspond to content of the one of the plurality of policy files; and
synchronizing content of a mapping file residing in a local memory of the mobile device to correspond to content of the one of the plurality of mapping files.

16. A mobile device, comprising:
a processor; and
a memory coupled to the processor and storing computer readable program code that when executed by the processor causes the processor to perform operations comprising:
responsive to occurrence of a defined event associated with execution of an application by the mobile device, fetching a policy file and a mapping file from a policy server through a data network, the policy file containing vendor specific policy events that define vendor specific device features that the application is allowed to access, the mapping file defining associations between mobile device specific features of the mobile device and device features, wherein the mapping file is different from the policy file, and wherein each vendor specific device feature defined by the vendor specific policy events in the policy file corresponds to a device feature associated with a mobile device specific feature of the mobile device in the mapping file;
locally saving the policy file and the mapping file in a local memory of the mobile device;
receiving a policy evaluation request that identifies one of the mobile device specific features of the mobile device that the application will invoke;
identifying one of the vendor specific policy events that defines one of the vendor specific device features corresponding to one of the device features that is associated with the one of the mobile device specific features in the mapping file, based on content of the mapping file in the local memory defining the association between the one of the device features and the one of the mobile device specific features;
obtaining the one of the vendor specific policy events defining the one of the vendor specific device features, which corresponds to the one of the device features associated with the one of the mobile device specific features, from the policy file in the local memory;
evaluating whether the application is allowed to access the one of the vendor specific device features, which corresponds to the one of the device features associated with the one of the mobile device specific features; and
based on the evaluating, controlling whether the application is allowed to invoke the one of the mobile device specific features.

17. The mobile device of claim 16, wherein the operations further comprise:
receiving another policy evaluation request that identifies another one of the mobile device specific features of the mobile device that the application will invoke;
identifying another one of the policy events that defines another one of the vendor specific device features corresponding to another one of the device features that is associated with the another one of the mobile device specific features based on content of the mapping file in the local memory defining the association between the another one of the device features and the another one of the mobile device specific features;
obtaining the another one of the policy events defining the another one of the vendor specific device features, which corresponds to the another one of the device features associated with the another one of the mobile device specific features, from the policy file in the local memory;
evaluating whether the application is allowed to access the another one of the vendor specific device features, which corresponds to the another one of the device features associated with the another one of the mobile device specific features; and
based on the evaluating, controlling whether the application is allowed to invoke the another one of the mobile device specific features.

18. The mobile device of claim 17, wherein:
the policy evaluation request and the another policy evaluation request are generated by different ones of a pair of policy evaluation functions contained at different locations within the application, the pair of policy evaluation functions having a same syntax as each other, an argument of one of the pair of policy evaluation functions identifies the one of the mobile device specific features of the mobile device, and an argument of the other one of the pair of policy evaluation functions identifies the another one of the mobile device specific features of the mobile device.

19. The mobile device of claim 16, wherein the operations further comprise:
   identifying the occurrence of the defined event associated with execution of the application by the mobile device responsive to receiving login information from the application identifying a user of the mobile device,
   wherein the fetching the policy file and the mapping file from the policy server through the data network, comprises:
      communicating a login request message through the data network to the policy server, the login request message containing the login information;
      fetching the policy file and the mapping file from the policy server responsive to receiving an indication from the policy server that the user is authorized to request the policy file and the mapping file from the policy server.

20. The mobile device of claim 16, wherein:
   the controlling whether the application is allowed to invoke the one of the mobile device specific features comprises:
      responsive to determining, based on the evaluating, that the application is allowed to invoke the one of the mobile device specific features, signaling the application to execute an operating system (OS) application programming interface (API) call that invokes the one of the mobile device specific features; and
      responsive to determining, based on the evaluating, that the application is not allowed to invoke the one of the mobile device specific features, signaling the application to prevent execution of the OS API call that invokes the one of the mobile device specific features; and
   the receiving a policy evaluation request that identifies one of the mobile device specific features of the mobile device that the application will invoke, comprises:
      receiving an argument from a policy evaluation function that is contained in the application and executed by the mobile device, the argument identifying the one of the mobile device specific features of the mobile device, and the policy evaluation function is configured to be executed before the OS API call can be executed by the mobile device.

* * * * *